United States Patent
Henkensmeier

(10) Patent No.: US 8,372,894 B2
(45) Date of Patent: Feb. 12, 2013

(54) METHOD FOR PRODUCING A RADIATION ON GRAFTED POLYMER

(75) Inventor: Dirk Henkensmeier, Seoul (KR)

(73) Assignee: Belenos Clean Power Holding AG, Bienne (CH)

( * ) Notice: Subject to any disclaimer, the term of this patent is extended or adjusted under 35 U.S.C. 154(b) by 66 days.

(21) Appl. No.: 13/119,068

(22) PCT Filed: Feb. 23, 2009

(86) PCT No.: PCT/EP2009/052114
§ 371 (c)(1),
(2), (4) Date: Jun. 14, 2011

(87) PCT Pub. No.: WO2010/031598
PCT Pub. Date: Mar. 25, 2010

(65) Prior Publication Data
US 2011/0245365 A1 Oct. 6, 2011

(30) Foreign Application Priority Data
Sep. 17, 2008 (EP) .................................. 08164502

(51) Int. Cl.
C08F 2/42 (2006.01)
C08F 2/46 (2006.01)
C08J 3/28 (2006.01)
H01M 8/00 (2006.01)

(52) U.S. Cl. ............ 522/125; 522/71; 522/74; 522/78; 522/79; 522/82; 522/113; 522/114; 522/134; 522/135; 522/149; 522/155; 522/156; 522/157; 522/158; 522/159; 522/161

(58) Field of Classification Search .............. 522/113, 522/114, 125, 134, 135, 149, 155, 156, 157, 522/158, 159, 161, 71, 74, 78, 82, 79, 83
See application file for complete search history.

(56) References Cited

U.S. PATENT DOCUMENTS

| | | | |
|---|---|---|---|
| 3,337,649 A * | 8/1967 | Black et al. | 522/116 |
| 3,565,780 A * | 2/1971 | Zimmerman et al. | 8/115.52 |
| 5,051,312 A * | 9/1991 | Allmer | 428/458 |
| 5,229,172 A * | 7/1993 | Cahalan et al. | 427/536 |
| 5,817,718 A * | 10/1998 | Nezu et al. | 525/64 |
| 5,994,426 A * | 11/1999 | Nezu et al. | 522/125 |

(Continued)

FOREIGN PATENT DOCUMENTS
EP 1 693 101 8/2006
JP 55 129407 10/1980
(Continued)

OTHER PUBLICATIONS
International Search Report Issued Apr. 1, 2009 in PCT/EP09/052114 filed Feb. 23, 2009.

*Primary Examiner* — Sanza McClendon
(74) *Attorney, Agent, or Firm* — Oblon, Spivak, McClelland, Maier & Neustadt, L.L.P.

(57) ABSTRACT

A method for producing a graft polymer comprises the steps of: a) irradiating a base polymer with an electron beam or a source of γ-radiation, b) contacting a grafting solution with the base polymer, wherein the grafting solution contains at least one oxygen scavenger and at least one graft monomer selected from the group consisting of styrene and styrene derivatives, and c) graft polymerizing the mixture of the base polymer and the grafting solution obtained in step b).

20 Claims, 1 Drawing Sheet

U.S. PATENT DOCUMENTS

| | | |
|---|---|---|
| 6,444,722 B1 | 9/2002 | Dang et al. |
| 6,518,327 B1 | 2/2003 | Dang et al. |
| 8,263,287 B2 * | 9/2012 | Takahashi et al. ............ 429/493 |
| 2006/0178484 A1 | 8/2006 | Dang |
| 2008/0171251 A1* | 7/2008 | Takagi et al. .................. 429/33 |
| 2008/0199754 A1* | 8/2008 | Scherer et al. ................. 429/33 |

FOREIGN PATENT DOCUMENTS

| | | |
|---|---|---|
| JP | 2004 51685 | 2/2004 |
| JP | 2004 158270 | 6/2004 |
| WO | 02 36650 | 5/2002 |
| WO | 2006 084591 | 8/2006 |

* cited by examiner

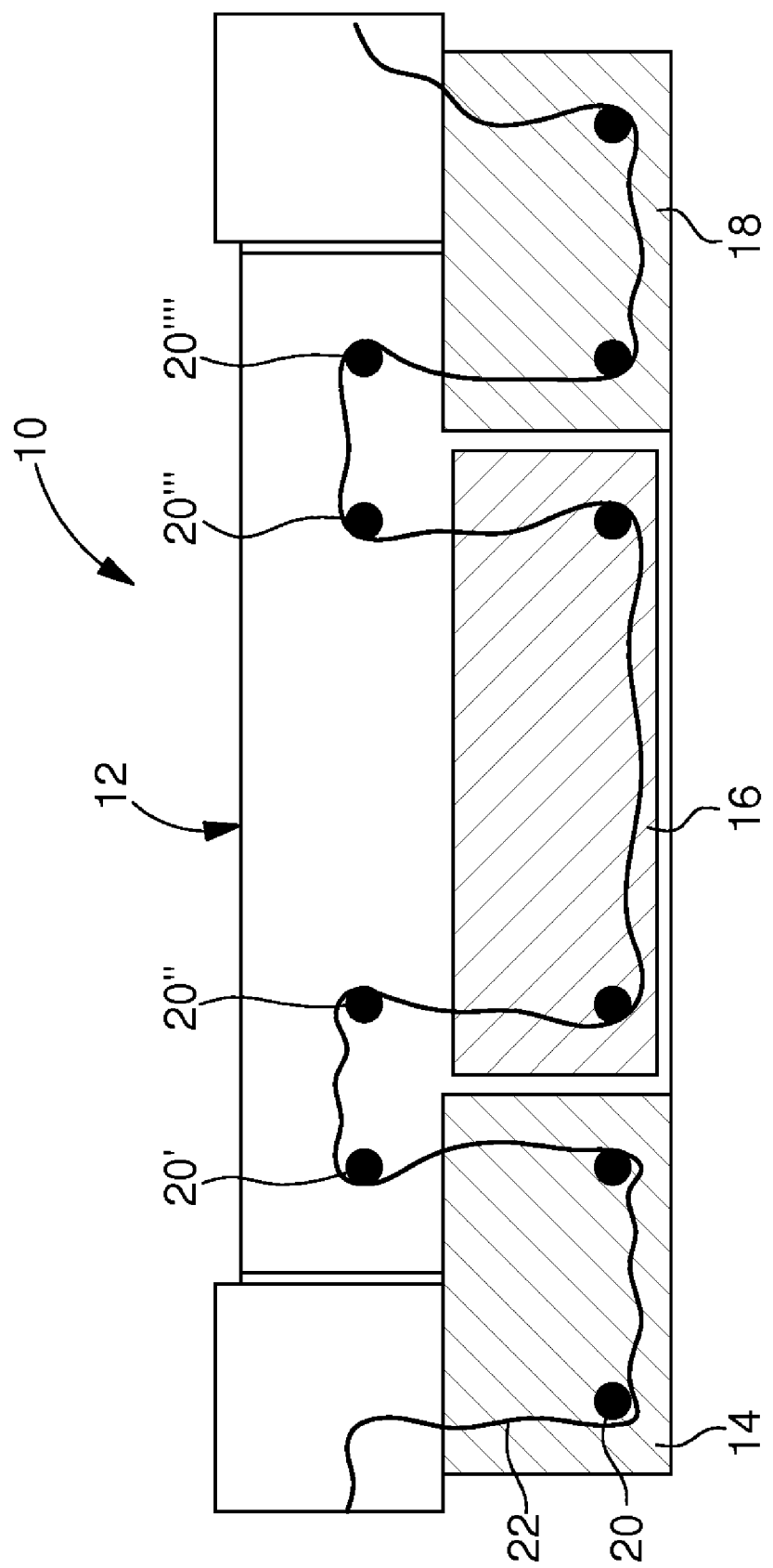

METHOD FOR PRODUCING A RADIATION ON GRAFTED POLYMER

The present invention relates to a method for producing a radiation grafted polymer.

Radiation-induced graft polymerization is one of the various known polymerization techniques and is especially applied for the introduction of functional radicals into polymers. During the radiation-induced graft polymerization process a substrate polymer film is first irradiated in order to form radicals and to activate the polymer, before one or more polymerizable monomers are grafted from the polymer. This technique is for example frequently used to produce ion-exchange membranes for the use in fuel cells, wherein a base polymer film is firstly irradiated, whereupon styrene or a styrene derivative is grafted onto the base polymer film, before the grafted polystyrene chains are finally sulfonated.

A respective method is known from WO 2006/084591 A1, which discloses a method for preparing a membrane comprising the steps of irradiating a base polymer film with electromagnetic and/or particle radiation in order to form radicals within the polymer film, exposing the irradiated film to a mixture of monomers amenable to radical polymerization comprising α-methylstyrene and methacrylonitrile in order to achieve the formation of a graft copolymer in the irradiated film and sulfonating the grafted film to introduce sulfonic acid sites providing ionic conductivity to the material. Because radiation-induced graft polymerizations are as all radical polymerizations susceptible to oxygen, because the presence of oxygen during the graft polymerization inhibits or even prevents the polymerization reaction from taking place, the reactor, in which the radiation-induced graft polymerization is performed, is usually purged before the beginning of the polymerization reaction and during the whole polymerization reaction with nitrogen, in order to eliminate the oxygen completely or to at least reduce the oxygen content in the grafting solution, i.e. in the solution containing the monomer(s) to be grafted onto the base polymer, to a sufficient degree.

The extent of the reduction of the oxygen content in the grafting solution due to the nitrogen purge before the beginning of the polymerization reaction strongly depends on the time for which and the flow rate with which the nitrogen or any other inert gas is purged through the reactor. Typically, a sufficient reduction of the oxygen content in the grafting solution requires the purge of the reactor with an inert gas for a relatively long period of time before the beginning of the polymerization reaction, e.g. for several hours for a reactor containing several liters. This is among others due to the fact that the removal of oxygen from the grafting solution can only be controlled, if at all, via the oxygen content at the interface between the grafting solution and the inert gas. Because this control variable, however, can be only poorly controlled in practice, it is necessary to include a long safety margin to the purging time, in order to assure a constant quality of the product.

For economical reasons it is not only desirable to reduce the consumption of inert gas, but it is also desirable to reduce the purge time. A further drawback of the long period of time required for the purge of the reactor before the beginning of the polymerization in known methods for the production of radiation grafted polymers is that the radical density of an irradiated film decreases at room temperature, i.e. during the purge period before the beginning of the polymerization, so that the grafting yield in the resulting polymer decreases, if the graft polymerization time is not prolonged.

The object underlying the present invention is the provision of an easy, fast and inexpensive method for producing a radiation-induced graft polymer using styrene or a styrene derivative as graft monomer, in which oxygen is completely or at least virtually completely eliminated from the grafting solution and the base polymer before the beginning of the graft polymerization step and during the graft polymerization step, wherein a purge of the grafting solution and/or the base polymer with an inert gas before the beginning of the graft polymerization step is required, if it all, only for a comparatively short period of time.

According to the present invention, this object is satisfied by providing a method for producing a graft polymer comprising the steps of:
  a) irradiating a base polymer with an electron beam or a source of γ-radiation,
  b) contacting a grafting solution with the base polymer, wherein the grafting solution contains at least one oxygen scavenger and at least one graft monomer selected from the group consisting of styrene and styrene derivatives, and
  c) graft polymerizing the mixture of the base polymer and the grafting solution obtained in step b).

This solution bases on the finding that by adding at least one oxygen scavenger into the grafting solution further containing the styrene or styrene derivative, respectively, the oxygen content in the grafting solution is quickly and efficiently decreased to virtually zero so that the purge time necessary before the beginning of the graft polymerization is significantly reduced compared with the known methods for producing graft polymers.

The term graft polymer comprises in the sense of the present patent application in accordance with the usual meaning of this technical term graft homopolymers as well as graft copolymers.

Preferably, the base polymer is first irradiated (step a)), and the grafting solution is afterwards contacted with the irradiated polymer (step b)). It should be noted, however, that step b) does not necessarily have to be carried out after step a), i.e. instead of irradiating the base polymer before bringing it into contact with the grafting solution ("pre-irradiation grafting"), it is also possible to irradiate the polymer after having brought it into contact with the grafting solution.

Basically, any known oxygen scavenger may be used in the present invention, as long as it has a sufficient solubility in the grafting solution. Good results are particularly obtained, if the oxygen scavenger added to the grafting solution is selected from the group consisting of hydrazine, hydrazones, carbohydrazones, alkylsemicarbazides, arylsemicarbazides, 1,3-dihydroxyacetone, sulfites and arbitrary combinations of two or more of the aforementioned compounds.

Most preferably, the oxygen scavenger added to the grafting solution is a sulfite compound, e.g. a sulfite compound selected from the group consisting of sodium sulfite, potassium sulfite, ammonium sulfite, sodium bisulfite, potassium bisulfite, ammonium bisulfite and arbitrary combinations of two or more of the aforementioned compounds. Sulfite compounds have the advantage of being non-toxic and the reaction rate for sulfite compounds is very fast compared to most other oxygen scavengers. The oxygen scavenging effect of sulfite compounds is due to the reaction of sulfite ions with oxygen and protons under formation of sulfate ions and water according to the following reaction equation: $SO_3^{2-}+O_2+2.H^+ \rightarrow SO_4^{2-}+H_2O$. For this reason, sulfite compounds are applied as oxygen scavengers in aqueous systems, such as boiler systems. However, it was unexpected that a sulfite compound is able to efficiently scavenge oxygen in a grafting solution containing styrene or a styrene derivative, respectively, as graft monomer, i.e. an aromatic hydrocarbon having virtually no solubility in water, necessitating organic solvents, which are known to hinder the scavenging reaction in some cases.

The optimum amount of oxygen scavenger to be added to the grafting solution can be calculated or determined by experiments. Particularly in the case of a sulfite compound, for example, the amount of oxygen scavenger in the grafting solution lies preferably in a range between 0.5 and 4 g/l and more preferably between 1 and 3 g/l.

Basically, styrene, any styrene derivative or a mixture of two or more different styrene derivatives may be used as graft monomer. Particular good results are obtained, if the at least one graft monomer is selected from the group consisting of styrene, α-methylstyrene, methyl-α-methylstyrene, methoxy-α-methylstyrene, sodium-α-methylstyrene sulfonate and arbitrary combinations of two or more of the aforementioned compounds.

According to a further preferred embodiment of the present invention, the grafting solution, which is contacted in step b) with the base polymer, contains—apart from the at least one graft monomer and the oxygen scavenger—at least one graft comonomer, which preferably increases the grafting yield. Good results are particularly obtained, if the graft comonomer is methacrylonitrile.

If necessary, the grafting solution may further comprise one or more crosslinkers, which are preferably selected from the group consisting of divinylbenzene, bis(vinyl phenyl) ethane, diisopropenylbenzene, triallyl cyanurate, N,N'-methylene-bis-acrylamide, diallylmaleinate and arbitrary combinations of two or more of the aforementioned compounds.

In order to facilitate or to improve the dissolution of the monomer in the grafting solution, it is preferred that the grafting solution further contains at least one solvent. Examples for suitable solvents are alcohols, such as $C_1$-$C_{10}$-alcohols. Particular good results are obtained, if the solvent is methanol, ethanol, 1-propanol, 2-propanol, 1-butanol or 2-butanol, wherein 2-propanol is most preferred.

Exemplarily, the grafting solution may contain 10 to 70 wt. % of an alcohol as solvent, 10 to 30 wt. % of a graft monomer, 0 to 20 wt. % of a graft comonomer, 0.001 to 20 wt. % of an oxygen scavenger and 0 to 50 wt. % of water. More preferably, the grafting solution contains 40 to 60 wt. % of an alcohol as solvent, 15 to 25 wt. % of a graft monomer, 5 to 15 wt. % of a graft comonomer, 0.05 to 2 wt. % of an oxygen scavenger and 10 to 30 wt. % of water.

Instead of such a grafting solution, an emulsion comprising mainly water as solvent and a surfactant as an additive may used. The oxygen scavenger would then be solved completely in the bulk phase.

The base polymer, which is preferably applied in the form of a film, may be composed of any polymer being able to be grafted with styrene or a styrene derivative. Thus, the base polymer may be a homopolymer or a copolymer, which may or may not be fluorinated. Preferably, the base polymer is a partially fluorinated or perfluorated homopolymer and even more preferably a partially fluorinated or perfluorated copolymer. Examples for suitable fluorinated polymers are polytetrafluoroethylene, poly(tetrafluoroethylene-co-perfluoropropyl vinyl ether), poly(tetrafluoroethylene-co-hexafluoropropylene), poly(vinylidene fluoride), poly(vinylidene fluoride-co-hexafluoropropylene), poly(ethylene-tetrafluoroethylene) and polyvinylfluoride. Examples for suitable non fluorinated polymers are polyethylene and polypropylene.

According to a further preferred embodiment of the present invention, poly(ethylene-tetrafluoroethylene) is used a base polymer, whereas α-methylstyrene is used as graft monomer and methacrylonitrile is used as graft comonomer.

In the aforementioned embodiment the grafting solution may exemplarily contain 40 to 60 wt. % of an alcohol, 15 to 25 wt. % of α-methylstyrene, 5 to 25 wt. % of methacrylonitrile, 0.05 to 2 wt. % of an oxygen scavenger and 15 to 30 wt. % of water. More preferably, the alcohol is 2-propanol and the oxygen scavenger is a sulfite compound so that the grafting solution contains 40 to 60 wt. % of 2-propanol, 10 to 20 wt. % of α-methylstyrene, 10 to 20 wt. % of methacrylonitrile, 0.05 to 2 wt. % of a sulfite compound and 10 to 25 wt. % of water.

In order to avoid a contamination of the grafting solution during the graft polymerization step c) with oxygen, it is preferred that the reactor, in which step c) is performed, is purged during the graft polymerization with an inert gas, preferably with nitrogen. As set out above, the reactor may also be purged with an inert gas before the beginning of the graft polymerization step, wherein the purge time of the pretreatment is compared with the known methods for producing a graft polymer comparatively short, namely for instance amounts to 3 to 30 minutes, more preferably to 3 to 20 minutes and even more preferably to 3 to 10 minutes.

Basically, the graft polymerization of step c) may be performed at any temperature between 20 and 80° C., preferably between 40 and 75° C. and more preferably between 50 and 70° C. Usually, the reaction time will be between a few hours and a few days, preferably between 5 and 48 hours, more preferably between 10 and 36 hours and even more preferably between 20 and 30 hours.

Any known electron beam source may be applied in the irradiation step a). Good results are for example obtained, if the base polymer is irradiated in step a) with a dose between 1 and 100 kGy, preferably between 1 and 50 kGy and more preferably between 10 and 30 kGy. Alternatively, a source of γ-radiation such as a $^{60}$Co-radiation source may be used.

According to a further preferred embodiment of the present invention, the graft polymer may be sulfonated after the graft polymerization step c) with any known sulfonation agent, such as with chlorosulfonic acid.

The method according to the present invention can be conducted batchwise or continuously.

As an example for a batchwise process, the irradiated base polymer film may be placed in a reactor, in which afterwards the oxygen scavenger containing grafting solution is introduced to be contacted with the base polymer film. Subsequently, the reactor is closed and optionally purged for instance for 5 minutes with nitrogen, before the reactor is heated to a temperature between 50 and 70° C. in order to start the graft polymerization of the base polymer with the styrene monomer or styrene derivative monomer, respectively, while the reactor is purged with nitrogen during the whole duration of the graft polymerization step. After completion of the reaction, the grafted polymer film is removed from the reactor and is, if necessary, washed.

As an example for a continuous process, the base polymer film may be continuously pulled through an irradiation device comprising a source for an electron beam in which the base polymer film is irradiated with a sufficient dose to form radicals and to activate the polymer. Afterwards, the irradiated base polymer film is continuously pulled through a reservoir containing the grafting solution, in which the polymer film is contacted with the oxygen scavenger and the monomer(s) containing grafting solution. The reservoir is placed in a container, which is purged with nitrogen in order to avoid a contamination of the grafting solution with oxygen. Afterwards, the polymer film may be optionally pulled through a washing solution in order to remove any impurities and may be afterwards dried.

Preferably, in the aforementioned continuous process the irradiated base polymer film is continuously pulled through a scavenger solution containing a solvent and an oxygen scavenger, before the film is pulled through the reservoir containing the grafting solution. Thereby, the irradiated base film is already contacted with the oxygen scavenger, before it is immersed in the grafting solution so that the oxygen contained in the base film is already removed or at least significantly reduced in the film, before it is contacted with the grafting solution and graft polymerized.

The graft polymer obtained with the method according to the present invention can be used among others as a solid polymer electrolyte in a membrane electrode assembly of a fuel cell.

Subsequently, the present invention is described in more detail with reference to preferred embodiments and to the accompanying drawing, in which:

FIG. 1 shows a device suitable for carrying out a continuous method for producing a graft polymer according to one embodiment of the present invention.

The device 10 for continuously carrying out a method for producing a graft polymer comprises a container 12, in which three reservoirs 14, 16, 18 are located. Furthermore, a plurality of guide rollers 20, 20', 20", 20"', 20"" are located in the container 12 and the reservoirs 14, 16, 18, respectively. While the reservoirs 14, 18 contain a solution containing sodium sulfate as oxygen scavenger, such as an aqueous sodium sulfite solution, the central reservoir 16 contains a grafting solution, which contains for instance 50 wt. % 2-propanol, 15 wt. % α-methylstyrene (AMS), 15 wt. % methacrylonitrile (MAN), 1.5 wt. % sodium sulfite and 18.5 wt. % water.

During the operation, a base polymer film 22 composed of poly(ethylene-tetrafluoroethylene) (ETFE) is continuously unwound from a supply roller (not shown) and is continuously pulled through an irradiation device (not shown) comprising a source for an electron beam or a source of γ-radiation, in which the base polymer film is irradiated with a sufficient electron beam dose or with a sufficient dose of γ-radiation to form radicals and to activate the polymer. Afterwards, the irradiated base polymer film is continuously pulled through the reservoir 14 containing the aqueous sodium sulfite solution in order to remove any oxygen from the ETFE-film. The reservoir 14 containing the aqueous sodium sulfite solution is located partly inside the container 12 and partly outside said container 12, thereby forming a lock ensuring that no oxygen can enter the container 12 with the film 22. After being pulled through the reservoir 14, the film is deflected by two guide rollers 20', 20" into the reservoir 16 containing the grafting solution. The whole container 12 is purged with nitrogen in order to avoid a contamination of the grafting solution and the ETFE-film with oxygen. Afterwards, the ETFE-film is deflected by means of two guide rollers 20"', 20"" into the aqueous sodium sulfite solution containing reservoir 18, before it is removed from the device 10.

The invention claimed is:

1. A method for producing a graft polymer, comprising:
 (a) irradiating a base polymer with an electron beam or a source of γ-radiation, to obtain an irradiated base polymer;
 (b) contacting a grafting solution with the irradiated base polymer, wherein the grafting solution comprises at least one oxygen scavenger and at least one graft monomer selected from the group consisting of styrene and a styrene derivative, to obtain a mixture; and
 (c) graft polymerizing the mixture of the base polymer and the grafting solution obtained in the contacting (b).

2. The method according to claim 1, wherein the oxygen scavenger is at least one selected from the group consisting of hydrazine, a hydrazone, a carbohydrazone, an alkylsemicarbazide, an arylsemicarbazide, 1,3-dihydroxyacetone, and a sulfite.

3. The method of claim 2, wherein the oxygen scavenger is at least one sulfite compound selected from the group consisting of sodium sulfite, potassium sulfite, ammonium sulfite, sodium bisulfite, potassium bisulfite, and ammonium bisulfite.

4. The method of claim 3, wherein the at least one oxygen scavenger in the grafting solution is present in an amount between 0.5 and 4 g/L.

5. The method of claim 1, wherein the graft monomer is at least one selected from the group consisting of styrene, α-methylstyrene, methyl-α-methylstyrene, methoxy-α-methylstyrene, and sodium-α-methylstyrene sulfonate.

6. The method of claim 5, wherein the grafting solution applied in the contacting (b) further comprises at least one graft comonomer.

7. The method of claim 6, wherein the graft comonomer is methacrylonitrile.

8. Method of claim 1, wherein the grafting solution further comprises at least one solvent.

9. The method of claim 8, wherein the at least one solvent is an alcohol.

10. The method of claim 8, wherein the grafting solution comprises:
 10 to 70 wt. % of an alcohol as solvent;
 10 to 30 wt. % of the at least one graft monomer;
 0 to 20 wt. % of a graft comonomer;
 0.001 to 20 wt. % of the at least one oxygen scavenger; and
 0 to 50 wt. % of water.

11. The method of claim 10, wherein the grafting solution comprises:
 40 to 60 wt. % of an alcohol as solvent;
 15 to 25 wt. % of the at least one graft monomer;
 5 to 15 wt. % of a graft comonomer;
 0.05 to 2 wt. % of the at least one oxygen scavenger; and
 10 to 30 wt. % of water.

12. The method of claim 1, wherein the base polymer is selected from the group consisting of polytetrafluoroethylene, poly(tetrafluoroethylene-co-perfluoropropyl vinyl ether), poly(tetrafluoroethylene-co-hexafluoropropylene), poly(vinylidene fluoride), poly(vinylidene fluoride-co-hexafluoropropylene), poly(ethylene-tetrafluoroethylene), polyvinyl fluoride, polyethylene, and polypropylene.

13. The method of claim 12, wherein the base polymer is poly(ethylene-tetrafluoroethylene) and the grafting solution comprises as the graft monomer α-methylstyrene and as a graft comonomer methacrylonitrile.

14. The method of claim 13, wherein the grafting solution comprises:
 40 to 60 wt. % of an alcohol;
 15 to 25 wt. % of α-methylstyrene;
 5 to 15 wt. % of methacrylonitrile;
 0.05 to 2 wt. % of the at least one oxygen scavenger; and
 15 to 30 wt. % of water.

15. The method of claim 1, wherein the graft polymerizing is performed in a reactor, which is purged during (c) with an inert gas.

16. The method of claim 1, wherein the graft polymerizing (c) is performed at a temperature between 20 and 80° C.

17. The method of claim 1, wherein the base polymer is irradiated in the irradiating (a) with a dose between 1 and 100 kGy.

18. The method according to claim 1, wherein the irradiated base polymer is a film and is pulled in the contacting (b) continuously through a reservoir comprising the grafting solution, wherein the reservoir is optionally located in a container which is purged with nitrogen.

19. The method of claim 18, wherein the irradiated base polymer is a film and is continuously pulled through a scavenger solution comprising a solvent and an oxygen scavenger, before the film is continuously pulled through the reservoir comprising the grafting solution.

20. The method of claim 3, wherein the at least one oxygen scavenger in the grafting solution is present in an amount between 1 and 3 g/L.

\* \* \* \* \*